United States Patent [19]
Gavin et al.

[11] Patent Number: 5,281,793
[45] Date of Patent: Jan. 25, 1994

[54] APPARATUS FOR POSITIONING A TEMPERATURE SENSING ELEMENT IN TEMPERATURE SENSING RELATIONSHIP WITH A MOVING OBJECT

[75] Inventors: Robert C. Gavin, Rochester; Thomas C. Keyes, Fairport, both of N.Y.

[73] Assignee: Xerox Corporation, Stamford, Conn.

[21] Appl. No.: 783,581

[22] Filed: Oct. 28, 1991

[51] Int. Cl.⁵ .......................................... G03G 15/20
[52] U.S. Cl. ................................. 219/216; 355/289; 374/153; 374/208
[58] Field of Search ............... 374/153, 208; 355/208, 355/282, 285, 289, 290; 219/216, 469; 338/22 R, 232; 73/866.5

[56] References Cited

U.S. PATENT DOCUMENTS

| | | | |
|---|---|---|---|
| 3,178,112 | 4/1965 | Rudd | 374/153 X |
| 3,357,249 | 12/1967 | Bernous et al. | 374/153 |
| 3,718,881 | 2/1973 | Szanny | 338/22 |
| 4,000,394 | 12/1976 | Bar-On | 219/216 |
| 4,441,827 | 4/1984 | Coderre | 374/153 |
| 4,533,808 | 8/1985 | Newman | 219/469 X |
| 4,821,062 | 4/1989 | Katoh et al. | 355/208 |
| 4,951,096 | 8/1990 | Derimiggio et al. | 355/285 |
| 5,088,836 | 2/1992 | Yamada et al. | 374/208 X |

FOREIGN PATENT DOCUMENTS

| | | | |
|---|---|---|---|
| 0078224 | 6/1980 | Japan | |
| 0166437 | 12/1981 | Japan | |
| 0044633 | 3/1984 | Japan | 374/153 |

OTHER PUBLICATIONS

10 Photographs: Thermistor Assembly Part No. 130K49332; Precision Engineering Ltd.; Wonastow Rd.; Monmouth, Gwent, UK.

Primary Examiner—A. T. Grimley
Assistant Examiner—Robert Beatty

[57] ABSTRACT

An apparatus for positioning a temperature sensing element in temperature sensing relationship with a moving object. The apparatus includes a base and also a resilient member, attached to the base, for supporting the sensing element. The apparatus further includes a mechanism for urging the sensing element toward the moving object. Moreover, the apparatus includes a mechanism, interposed between the resilient member and the moving object, for reducing frictional resistance between the apparatus and the moving object. The apparatus additionally includes a mechanism, removably attachable to the base, for securing the resistance reducing mechanism at a position interposed between the resilient member and the moving object.

16 Claims, 5 Drawing Sheets

APPARATUS FOR POSITIONING A TEMPERATURE SENSING ELEMENT IN TEMPERATURE SENSING RELATIONSHIP WITH A MOVING OBJECT

This invention relates generally to an electrophotographic printing machine and, more particularly, concerns an apparatus for positioning a temperature sensing element in temperature sensing relationship with a moving object.

The marking engine of an electronic reprographic printing system is frequently an electrophotographic printing machine. In an electrophotographic printing machine, a photoconductive member is charged to a substantially uniform potential to sensitize the surface thereof. The charged portion of the photoconductive member is thereafter selectively exposed in an imaging zone to a light source such as a raster output scanner. Exposure of the charged photoconductive member dissipates the charge thereon in the irradiated areas. This records an electrostatic latent image on the photoconductive member corresponding to the informational areas contained within the original document being reproduced. After the electrostatic latent image is recorded on the photoconductive member, the latent image is developed by bringing a developer material into contact therewith. Generally, the developer material comprises toner particles adhering triboelectrically to carrier granules. The toner particles are attracted to the latent image from the carrier granules to form a toner image on the photoconductive member which is subsequently transferred to a copy sheet. The copy sheet is then heated to permanently affix the toner image thereto in image configuration.

Multi-color electrophotographic printing is substantially identical to the foregoing process of black and white printing. However, rather than forming a single latent image on the photoconductive surface, successive latent images corresponding to different colors are recorded thereon. Each single color electrostatic latent image is developed with toner of a color complimentary thereto. This process is repeated a plurality of cycles for differently colored images and their respective complimentarily colored toner. Each single color toner image is transferred to the copy sheet in superimposed registration with the prior toner image. This creates a multi-layered toner image on the copy sheet. Thereafter, the multi-layered toner image is permanently affixed to the copy sheet (e.g. by a fuser roll) thus creating a color copy.

In both of the above processes of printing, regulation of the temperature of certain components, such as the fuser roll, needs to be accomplished. As a result, various devices have been designed which position a temperature sensing element in temperature sensing relationship with a subject component. The temperature sensing element along with associated circuitry generate electrical signals in response to the temperature of the subject component. A heat source is selectively activated and deactivated in response to the signals generated by the temperature sensing element and its associated circuitry thereby regulating the temperature of the subject component.

Some devices that have been designed to position a temperature sensing element in temperature sensing relationship with a subject component deteriorate after a less than desirable time period of operation. Also, some devices that have been designed to position a temperature sensing element in temperature sensing relationship with a subject component do not allow for visual inspection of certain characteristics of the device while the device is mounted for operation.

The following disclosures may be relevant to various aspects of the present invention:

U.S. Pat. No. 4,821,062
Patentee: Katoh et al.
Issued: Apr. 11, 1989

U.S. Pat. No. 4,951,096
Patentee: Derimiggio et al.
Issued: Aug. 21, 1990

The relevant portions of the foregoing disclosures may be briefly summarized as follows:

U.S. Pat. No. 4,821,062 describes a heat fixing device for an image reproduction machine. The device includes a heat roller having a heat source for heat fixing a toner image on a copy paper, a temperature sensing element for sensing the temperature of the heat roller, and a temperature control element responsive to the output of the temperature sensing element for controlling the power supply to the heat source. The temperature sensing element and the temperature control element are integrally combined.

U.S. Pat. No. 4,951,096 discloses a temperature control device, for controlling, at a desired set point, the temperature of an environment or member being heated or being cooled.

In accordance with one aspect of the present invention, there is provided an apparatus for positioning a temperature sensing element in temperature sensing relationship with a moving object. The apparatus includes a base and also a resilient member, attached to the base, for supporting the sensing element. The apparatus further includes a mechanism for urging the sensing element toward the moving object. Moreover, the apparatus includes a mechanism, interposed between the resilient member and the moving object, for reducing frictional resistance between the apparatus and the moving object. The apparatus additionally includes a mechanism, removably attachable to the base, for securing the resistance reducing mechanism at a position interposed between the resilient member and the moving object.

Pursuant to another aspect of the present invention, there is provided a device for detecting the temperature of a roller. The device includes a base and also a resilient member attached to the base. The device further includes a sensing element supported by the resilient member. In addition, the device includes a mechanism for urging the sensing element toward the roller. Moreover, the device includes a mechanism, interposed between the resilient member and the roller, for reducing frictional resistance between the device and the roller. The device additionally includes a mechanism, removably attachable to the base, for securing the resistance reducing mechanism at a position interposed between the resilient member and the roller.

Other features of the present invention will become apparent as the following description proceeds and upon reference to the drawings, in which.

While the present invention will hereinafter be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

Figure 1:
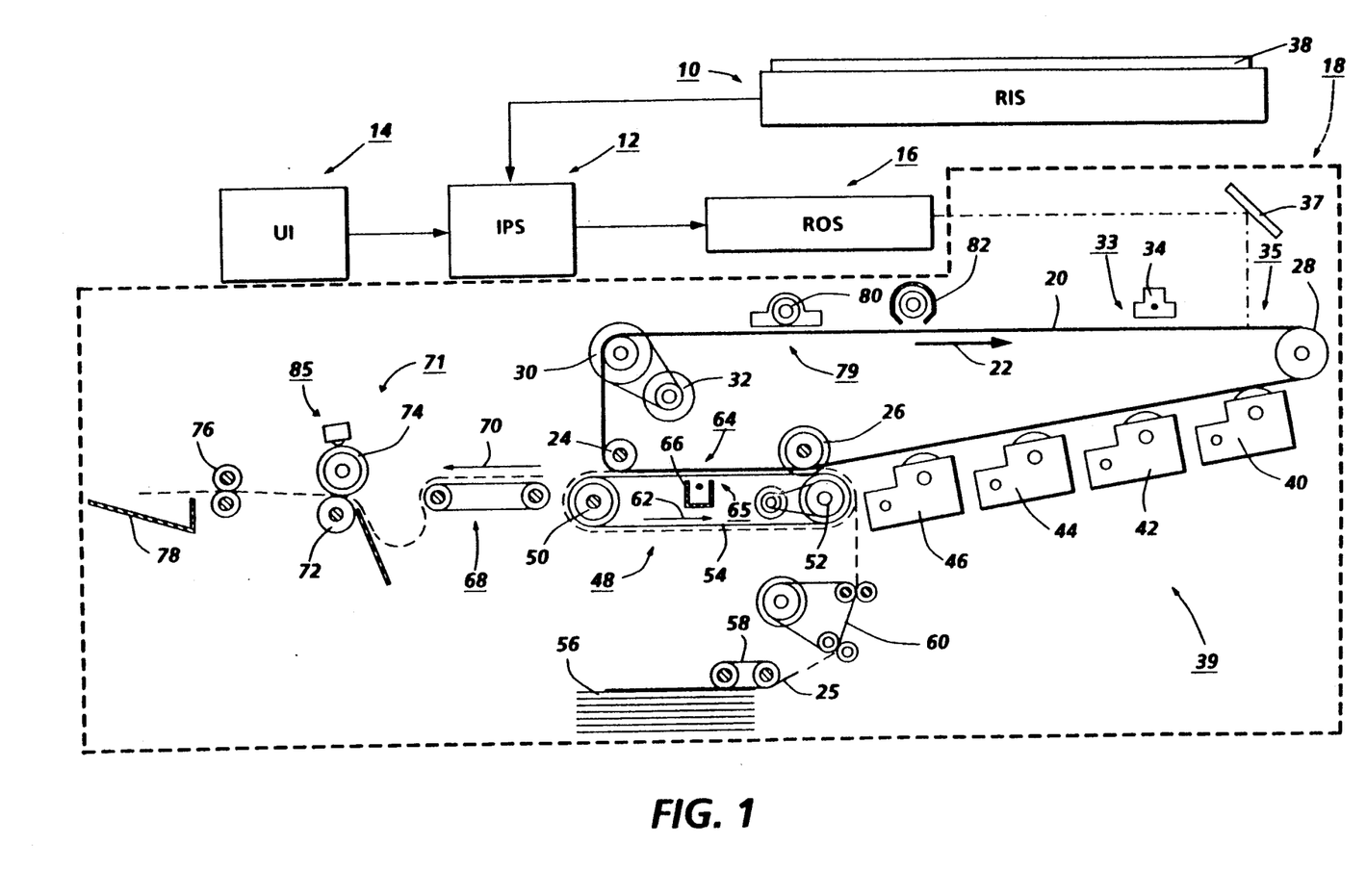
FIG. 1 is a schematic elevational view showing an electrophotographic printing machine incorporating the features of the present invention therein.

For a general understanding of the features of the present invention, reference is made to the drawings. In the drawings, like references have been used throughout to designate identical elements. FIG. 1 is a schematic elevational view showing an electrophotographic printing machine incorporating the features of the present invention therein. It will become evident from the following discussion that the present invention is equally well suited for use in a wide variety of systems, and is not necessarily limited in its application to the particular system shown herein.

Turning initially to FIG. 1, during operation of the printing system, a multi-color original document 38 is positioned on a raster input scanner (RIS), indicated generally by the reference numeral 10. The RIS contains document illumination lamps, optics, a mechanical scanning drive, and a charge coupled device (CCD array). The RIS captures the entire image from original document 38 and converts it to a series of raster scan lines and moreover measures a set of primary color densities, i.e. red, green and blue densities, at each point of the original document. This information is transmitted as electrical signals to an image processing system (IPS), indicated generally by the reference numeral 12. IPS 12 converts the set of red, green and blue density signals to a set of colorimetric coordinates. The IPS contains control electronics which prepare and manage the image data flow to a raster output scanner (ROS), indicated generally by the reference numeral 16. A user interface (UI), indicated generally by the reference numeral 14, is in communication with IPS 12. UI 14 enables an operator to control the various operator adjustable functions. The operator actuates the appropriate keys of UI 14 to adjust the parameters of the copy. UI 14 may be a touch screen, or any other suitable control panel, providing an operator interface with the system. The output signal from UI 14 is transmitted to IPS 12. The IPS then transmits signals corresponding to the desired image to ROS 16, which creates the output copy image. ROS 16 includes a laser with rotating polygon mirror blocks. Preferably, a nine facet polygon is used. The ROS illuminates, via mirror 37, the charged portion of a photoconductive belt 20 of a printer or marking engine, indicated generally by the reference numeral 18, at a rate of about 400 pixels per inch, to achieve a set of subtractive primary latent images. The ROS will expose the photoconductive belt to record three latent images which correspond to the signals transmitted from IPS 12. One latent image is developed with cyan developer material. Another latent image is developed with magenta developer material and the third latent image is developed with yellow developer material. These developed images are transferred to a copy sheet in superimposed registration with one another to form a multi-colored image on the copy sheet. This multi-colored image is then fused to the copy sheet forming a color copy.

With continued reference to FIG. 1, printer or marking engine 18 is an electrophotographic printing machine. Photoconductive belt 20 of marking engine 18 is preferably made from a polychromatic photoconductive material. The photoconductive belt moves in the direction of arrow 22 to advance successive portions of the photoconductive surface sequentially through the various processing stations disposed about the path of movement thereof. Photoconductive belt 20 is entrained about transfer rollers 24 and 26, tensioning roller 28, and drive roller 30. Drive roller 30 is rotated by a motor 32 coupled thereto by suitable means such as a belt drive. As roller 30 rotates, it advances belt 20 in the direction of arrow 22.

Initially, a portion of photoconductive belt 20 passes through a charging station, indicated generally by the reference numeral 33. At charging station 33, a corona generating device 34 charges photoconductive belt 20 to a relatively high, substantially uniform potential.

Next, the charged photoconductive surface is rotated to an exposure station, indicated generally by the reference numeral 35. Exposure station 35 receives a modulated light beam corresponding to information derived by RIS 10 having multi-colored original document 38 positioned thereat. The modulated light beam impinges on the surface of photoconductive belt 20. The beam illuminates the charged portion of the photoconductive belt to form an electrostatic latent image. The photoconductive belt is exposed three times to record three latent images thereon.

After the electrostatic latent images have been recorded on photoconductive belt 20, the belt advances such latent images to a development station, indicated generally by the reference numeral 39. The development station includes four individual developer units indicated by reference numerals 40, 42, 44 and 46. The developer units are of a type generally referred to in the art as "magnetic brush development units." Typically, a magnetic brush development system employs a magnetizable developer material including magnetic carrier granules having toner particles adhering triboelectrically thereto. The developer material is continually brought through a directional flux field to form a brush of developer material. The developer material is constantly moving so as to continually provide the brush with fresh developer material. Development is achieved by bringing the brush of developer material into contact with the photoconductive surface. Developer units 40, 42, and 44, respectively, apply toner particles of a specific color which corresponds to the compliment of the specific color separated electrostatic latent image recorded on the photoconductive surface. The color of each of the toner particles is adapted to absorb light within a preselected spectral region of the electromagnetic wave spectrum. For example, an electrostatic latent image formed by discharging the portions of charge on the photoconductive belt corresponding to the green regions of the original document will record the red and blue portions as areas of relatively high charge density on photoconductive belt 20, while the green areas will be reduced to a voltage level ineffective for development. The charged areas are then made visible by having developer unit 40 apply green absorbing (magenta) toner particles onto the electrostatic latent image recorded on photoconductive belt 20. Similarly, a blue separation is developed by developer unit 42 with blue absorbing (yellow) toner particles, while the red separation is developed by developer unit 44 with red absorbing (cyan) toner particles. Developer unit 46 contains black toner particles and may be used to develop the electrostatic latent image formed from a black and white original document. Each of the developer units is moved into and out of an operative position. In the operative position, the magnetic brush is positioned substantially adjacent to the photoconductive belt, while in the non-operative position, the magnetic brush is spaced therefrom. In FIG. 1, developer unit 40 is shown in the operative position with developer units 42, 44 and 46 being in the non-operative position. During development of each electrostatic latent image, only one developer unit is in the operative position, the remaining developer units are in the non-operative position. This insures that each electrostatic latent image is developed with toner particles of the appropriate color without commingling.

After development, the toner image is moved to a transfer station, indicated generally by the reference numeral 65. Transfer station 65 includes a transfer zone, generally indicated by reference numeral 64. In transfer zone 64, the toner image is transferred to a sheet of support material 25, such as plain paper amongst others. At transfer station 65, a sheet transport apparatus, indicated generally by the reference numeral 48, moves the sheet into contact with photoconductive belt 20. Sheet transport 48 has a pair of spaced belts 54 entrained about a pair of rollers 50 and 52. A sheet gripper (not shown) extends between belts 54 and moves in unison therewith. Sheet 25 is advanced from a stack of sheets 56 disposed on a tray. A friction retard feeder 58 advances the uppermost sheet from stack 56 onto a pre-transfer transport 60. Transport 60 advances sheet 25 to sheet transport 48. Sheet 25 is advanced by transport 60 in synchronism with the movement of the sheet gripper. In this way, the leading edge of sheet 25 arrives at a preselected position, i.e., a loading zone, to be received by the open sheet gripper. The sheet gripper then closes securing sheet 25 thereto for movement therewith in a recirculating path. The leading edge of sheet 25 is secured releasably by the sheet gripper. As belts 54 move in the direction of arrow 62, the sheet moves into contact with the photoconductive belt, in synchronism with the toner image developed thereon. In transfer zone 64, a corona generating device 66 sprays ions onto the backside of the sheet so as to charge the sheet to the proper magnitude and polarity for attracting the toner image from photoconductive belt 20 thereto. The sheet remains secured to the sheet gripper so as to move in a recirculating path for three cycles. In this way, three different color toner images are transferred to the sheet in superimposed registration with one another. One skilled in the art will appreciate that the sheet may move in a recirculating path for four cycles when under color black removal is used. Each of the electrostatic latent images recorded on the photoconductive surface is developed with the appropriately colored toner and transferred to the sheet, in superimposed registration with one another, to form the multi-color copy of the colored original document.

After the last transfer operation, the sheet transport system directs the sheet to a vacuum conveyor, indicated generally by the reference numeral 68. Vacuum conveyor 68 transports the sheet, in the direction of arrow 70, to a fusing station, indicated generally by the reference numeral 71, where the transferred toner image is permanently fused to the sheet. The fusing station includes a heated fuser roll 74 and a pressure roll 72. The temperature of fuser roll 74 is maintained within a predetermined temperature range by a temperature control apparatus, indicated generally by the reference numeral 85. The sheet passes through the nip defined by fuser roll 74 and pressure roll 72. The toner image contacts fuser roll 74 so as to be affixed to the sheet. Thereafter, the sheet is advanced by a pair of rolls 76 to a catch tray 78 for subsequent removal therefrom by the machine operator.

The last processing station in the direction of movement of belt 20, as indicated by arrow 22, is a cleaning station, indicated generally by the reference numeral 79. A rotatably mounted fibrous brush 80 is positioned in the cleaning station and maintained in contact with photoconductive belt 20 to remove residual toner particles remaining after the transfer operation. Thereafter, a lamp 82 illuminates photoconductive belt 20 to remove any residual charge remaining thereon prior to the start of the next successive cycle.

Figure 2:
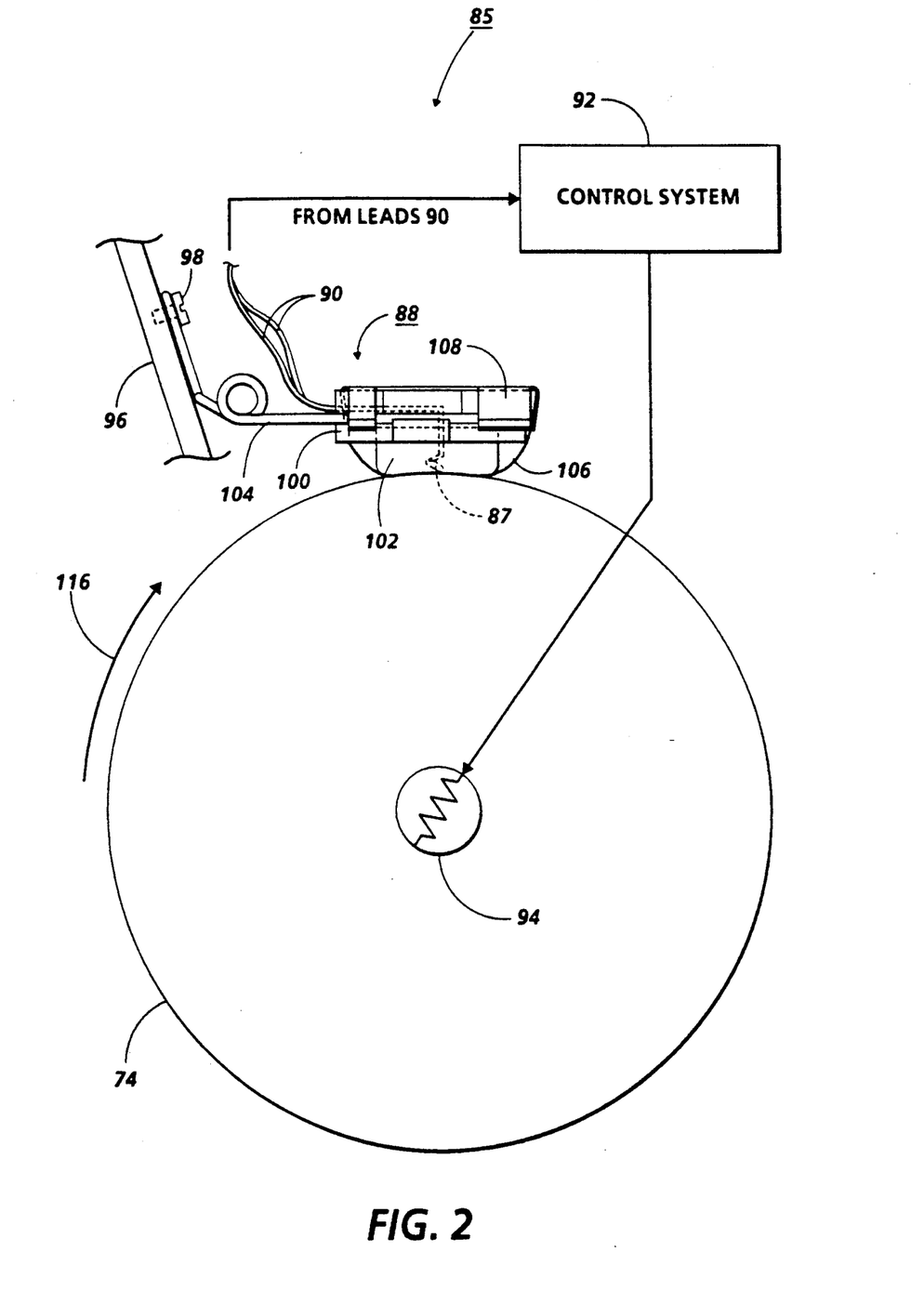
FIG. 2 is a schematic elevational view showing further details of the temperature control apparatus used in the electrophotographic printing machine of FIG. 1.

FIG. 2 shows temperature control apparatus 85 arranged to maintain the temperature of fuser roll 74 within a predetermined temperature range. Temperature control apparatus 85 includes a temperature sensing element 87, a pair of electrical leads 90 and a positioning apparatus, indicated generally by the reference numeral 88. Sensing element 87 is preferably a thermistor. Positioning apparatus 88 functions to locate sensing element 87 in temperature sensing relationship with fuser roll 74. Temperature control apparatus 85 further includes a control system 92 and a heat source 94. Heat source 94 is electrically coupled to control system 92 and the control system is electrically coupled to sensing element 87. Heat is transferred from heat source 94 to fuser roll 74.

Figure 3:
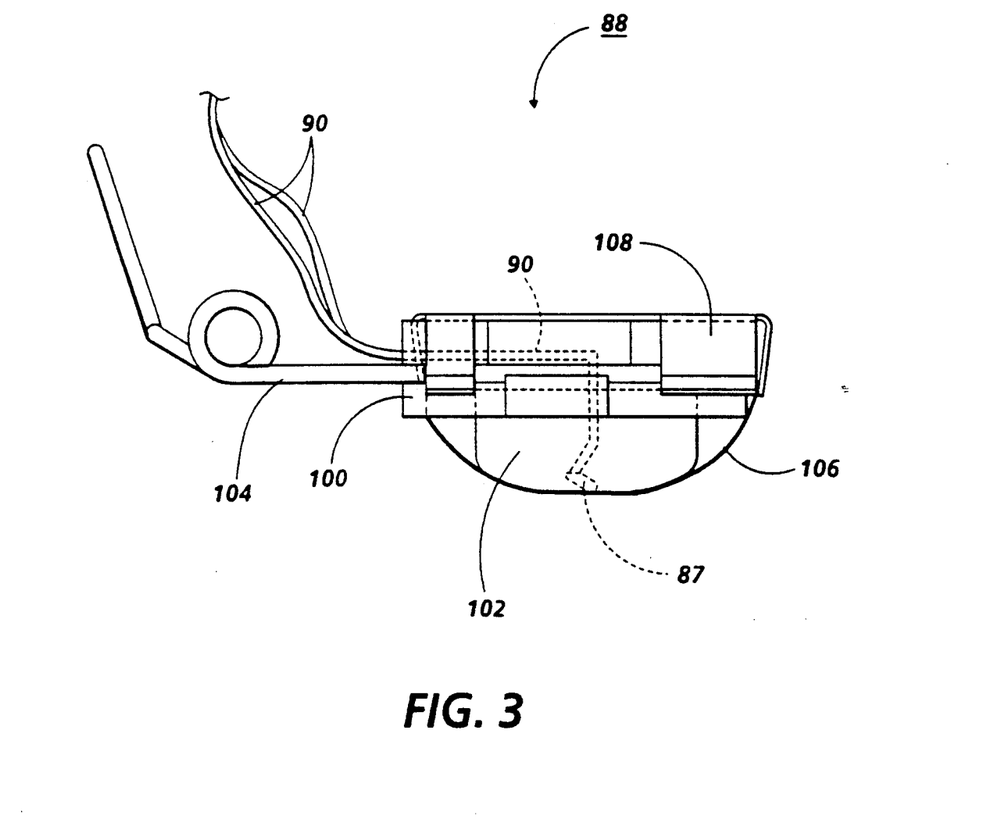
FIG. 3 is a side elevational view showing the positioning apparatus of the temperature control apparatus used in the electrophotographic printing machine of FIG. 1.
Figure 4:
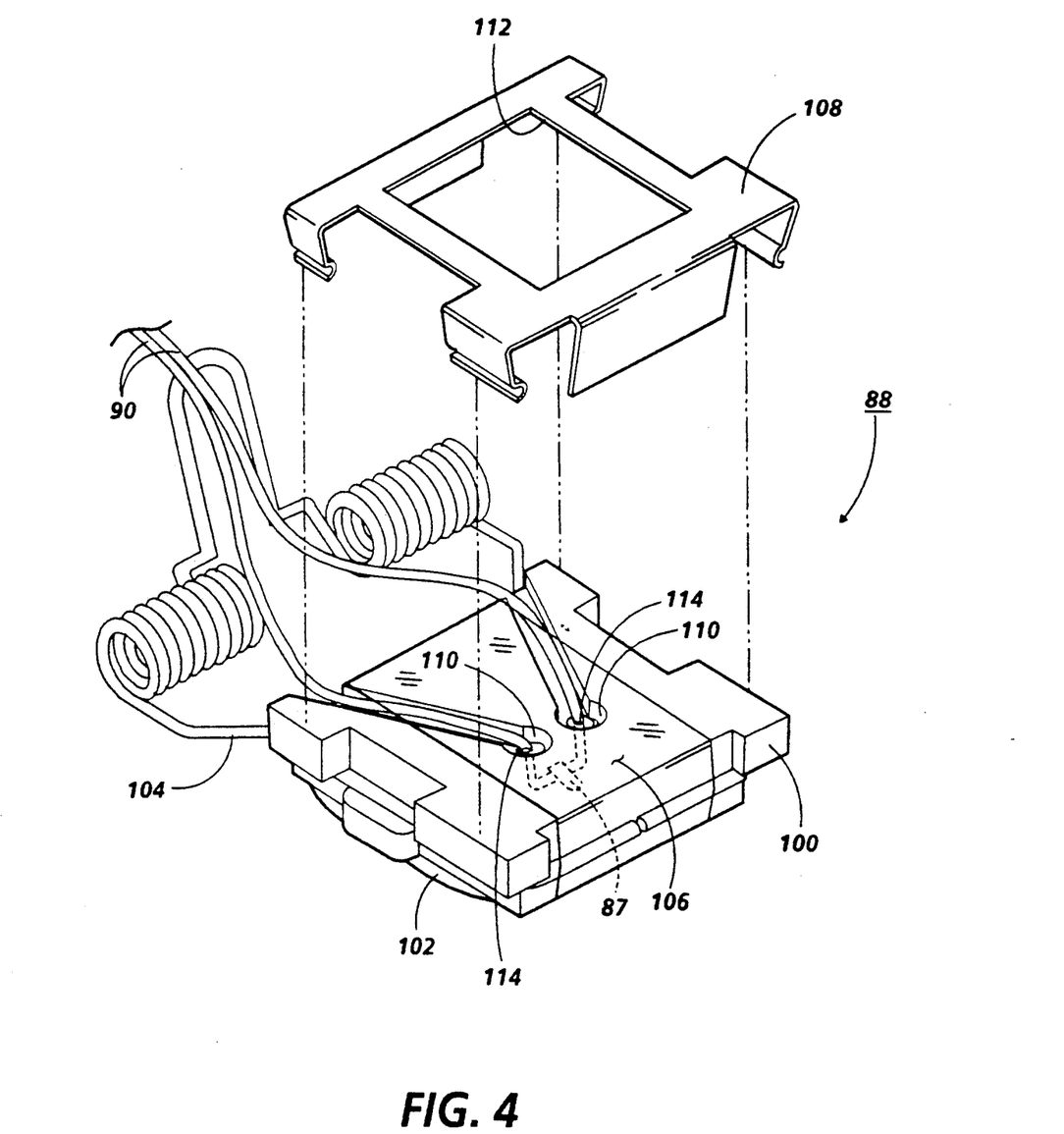
FIG. 4 is a partially exploded perspective view showing the positioning apparatus of the temperature control apparatus used in the electrophotographic printing machine of FIG. 1.
Figure 5:
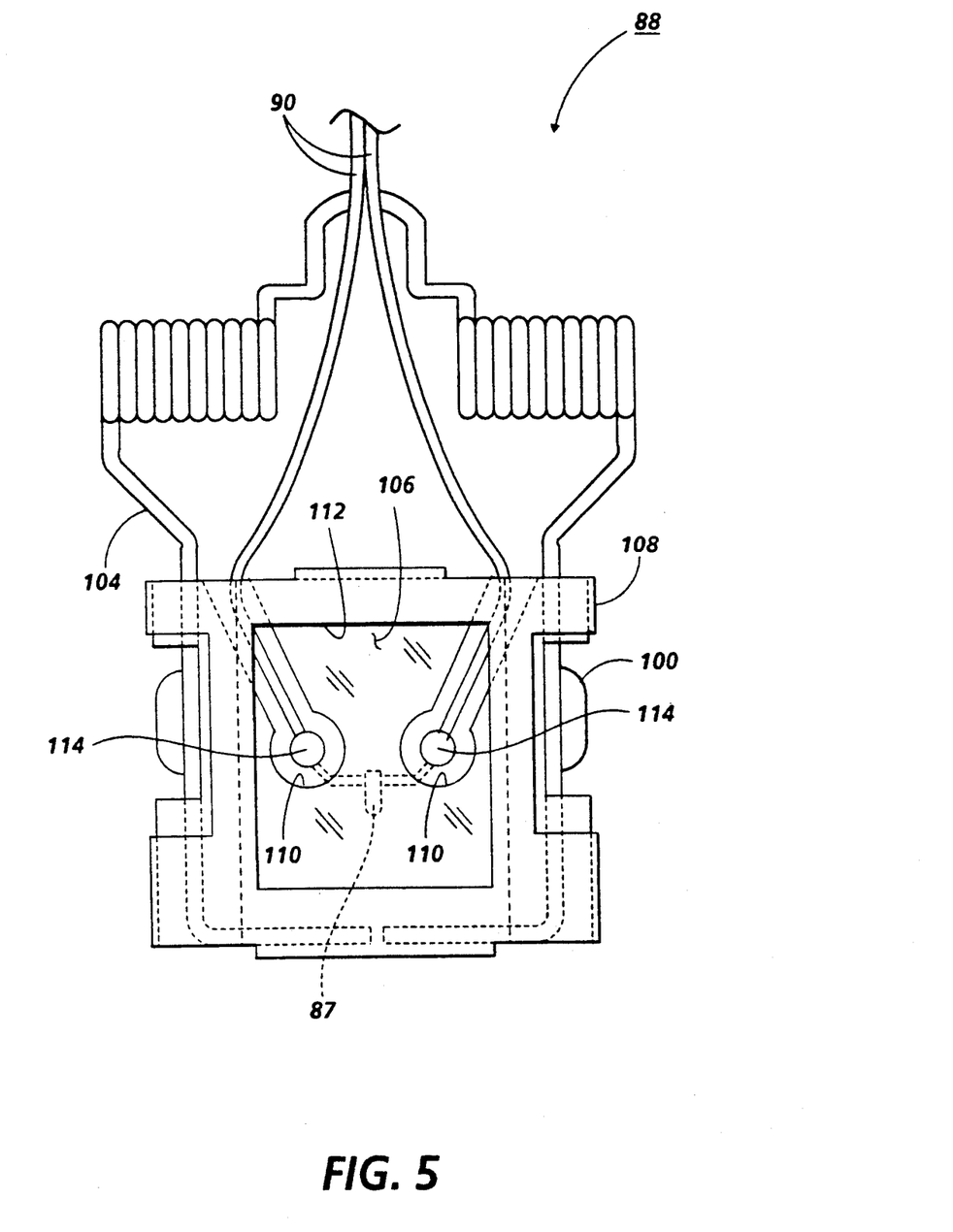
FIG. 5 is a planar view showing the positioning apparatus of the temperature control apparatus used in the electrophotographic printing machine of FIG. 1.

FIGS. 3-5 show positioning apparatus 88 in more detail. In particular, positioning apparatus 88 includes a base 100, a resilient member 102, a spring 104, a strip of tape 106 and a clip 108. Resilient member 102 is made from a foam silicone rubber. Moreover, the resilient member is removably attachable to base 100. Defined within base 100 is a pair of recesses 110. A part of each lead 90 is positioned in a respective recess 110. Sensing element 87 includes a pair of electrical couplings which are respectively electrically connected to leads 90 thereby defining a pair of connection sites 114 as shown in FIGS. 4 and 5. Tape 106 is substantially visually transparent. Tape 106 is made from a polyimide film. By way of example, tape 106 can be made from a polyimide film. By way of example, tape 106 can be made from KAPTON, a trademark of E. I. duPont de Nemours & Co., Inc. of Wilmington, Del. Clip 108 has an opening 112 defined therein. As a result, when clip 108 is attached to base 100, connection sites 114 are visually exposed through opening 112 as shown in FIG. 5.

Positioning apparatus 88 is shown in its use environment in FIG. 2. More specifically, the positioning apparatus is shown secured to a stationary member 96 by a fastener 98 thereby locating sensing element 87 in temperature sensing relationship with fuser roll 74. When positioning apparatus 88 is secured to stationary member 96 as shown in FIG. 2, spring 104 is partially compressed to bias or urge sensing element 87 toward fuser roll 74. On the other hand, FIGS. 3–5 show spring 104 in its relaxed state. FIG. 2 further shows tape 106 interposed between resilient member 102 and fuser roll 74. Tape 106 functions to reduce the frictional resistance between positioning apparatus 88 and fuser roll 74 as the fuser roll rotates in the direction of arrow 116. In addition, a portion of tape 106 is shown interposed between base 100 and clip 108 while the clip is attached to the base (see also FIGS. 3–5). As a result, clip 108 functions to secure tape 106 at a position interposed between resilient member 102 and fuser roll 74. Moreover, FIG. 2 shows a part of spring 104 interposed between base 100 and clip 108 while the clip is attached to the base (see also FIGS. 3–5). Consequently, clip 108 additionally functions to secure spring 104 to base 100. FIG. 2 further shows a portion of leads 90 interposed between base 100 and clip 108 while the clip is attached to the base (see also FIGS. 3–5). Thus, the clip also functions to reduce deterioration of the electrical connections existing between leads 90 and sensing element 87.

In recapitulation, the positioning apparatus of the present invention includes a base, a resilient member, a mechanism for urging the sensing element toward the fuser roll, a mechanism for reducing frictional resistance between the positioning apparatus and the fuser roll, and a mechanism for securing the resistance reducing mechanism at a position interposed between the resilient member and the fuser roll.

It is, therefore, apparent that there has been provided in accordance with the present invention, a positioning apparatus that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

We claim:

1. An apparatus for positioning a temperature sensing element in temperature sensing relationship with a moving object comprising:
   a base;
   a resilient member, attached to said base, for supporting the sensing element;
   means for urging the sensing element toward the moving object;
   means, interposed between said resilient member and the moving object, for reducing frictional resistance between the apparatus and the moving object; and
   means, removably attachable to said base, for securing said resistance reducing means at a position interposed between said resilient member and the moving object, wherein said securing means comprises a clip.

2. The apparatus of claim 1, wherein said clip has an opening defined therein.

3. The apparatus of claim 2, wherein the sensing element is connected to a pair of electrical leads thereby defining a pair of connection sites, each connection site of the pair of connection sites being visually exposed through the opening defined in said clip.

4. The apparatus of claim 1, wherein said base has a pair of recesses defined therein.

5. The apparatus of claim 4, wherein the sensing element is electrically connected to a pair of electrical leads, each lead of said pair of electrical leads having a part thereof positioned in a respective recess of said pair of recesses.

6. The apparatus of claim 5, wherein a portion of each lead of said pair of electrical leads is interposed between said base and said securing means.

7. An apparatus for positioning a temperature sensing element in temperature sensing relationship with a moving object comprising:
   a base;
   a resilient member, attached to said base, for supporting the sensing element;
   means for urging the sensing element toward the moving object, said urging means being attached to said base;
   means, interposed between said resilient member and the moving object, for reducing frictional resistance between the apparatus and the moving object; and
   means, removably attachable to said base, for securing said resistance reducing means at a position interposed between said resilient member and the moving object, and for preventing detachment of said urging means from said base.

8. The apparatus of claim 7, wherein a portion of said urging means is interposed between said base and said securing means.

9. A device for detecting the temperature of a roller comprising:
   a base;
   a resilient member attached to said base;
   a sensing element supported by said resilient member;
   means for urging said sensing element toward the roller;
   means, interposed between said resilient member and the roller, for reducing frictional resistance between the device and the roller; and
   means, removably attachable to said base, for securing said resistance reducing means at a position interposed between said resilient member and the roller, wherein said securing means comprises a clip.

10. The device of claim 9, wherein said clip has an opening defined therein.

11. The device of claim 10, wherein said sensing element is connected to a pair of electrical leads thereby defining a pair of connection sites, each connection site of the pair of connection sites being visually exposed through the opening defined in said clip.

12. The device of claim 9, wherein said base has a pair of recesses defined therein.

13. The device of claim 12, wherein said sensing element is electrically connected to a pair of electrical leads, each lead of said pair of electrical leads having a part thereof positioned in a respective recess of said pair of recesses.

14. The device of claim 13, wherein a portion of each lead of said pair of electrical leads is interposed between said base and said securing means.

15. A device for detecting the temperature of a roller comprising:
   a base;
   a resilient member attached to said base;
   a sensing element supported by said resilient member;

means for urging said sensing element toward the roller, said urging means being attached to said base;

means, interposed between said resilient member and the roller, for reducing frictional resistance between the device and the roller; and means, removably attachable to said base, for securing said resistance reducing means at a position interposed between said resilient member and the roller, and for preventing detachment of said urging means from said base.

16. The device of claim 15, wherein a portion of said urging means is interposed between said base and said securing means.

* * * * *